United States Patent
Aida et al.

(10) Patent No.: US 12,522,714 B2
(45) Date of Patent: Jan. 13, 2026

(54) POLYSILOXANE COMPOSITION

(71) Applicant: Merck Patent GmbH, Darmstadt (DE)

(72) Inventors: Kensuke Aida, Kakegawa (JP); Atsuhiko Sato, Kakegawa (JP); Rikio Kozaki, Kakegawa (JP); Kazuya Arima, Kakegawa (JP)

(73) Assignee: Merck Patent GmbH, Darmstadt (DE)

( * ) Notice: Subject to any disclaimer, the term of this patent is extended or adjusted under 35 U.S.C. 154(b) by 1068 days.

(21) Appl. No.: 17/286,440

(22) PCT Filed: Oct. 16, 2019

(86) PCT No.: PCT/EP2019/078033
§ 371 (c)(1),
(2) Date: Apr. 16, 2021

(87) PCT Pub. No.: WO2020/079043
PCT Pub. Date: Apr. 23, 2020

(65) Prior Publication Data
US 2021/0388177 A1 Dec. 16, 2021

(30) Foreign Application Priority Data
Oct. 19, 2018 (JP) .................................. 2018-197702

(51) Int. Cl.
*C08K 5/092* (2006.01)
*C08G 77/04* (2006.01)
*C09D 183/04* (2006.01)

(52) U.S. Cl.
CPC ............. *C08K 5/092* (2013.01); *C08G 77/04* (2013.01); *C09D 183/04* (2013.01)

(58) Field of Classification Search
None
See application file for complete search history.

(56) References Cited

U.S. PATENT DOCUMENTS

| | | | |
|---|---|---|---|
| 3,350,309 A * | 10/1967 | Buehler | .......... C10M 3/00 508/213 |
| 5,621,034 A | 4/1997 | Mautner | |
| 8,642,437 B2 | 2/2014 | Woo et al. | |
| 2004/0014922 A1* | 1/2004 | Buckmann | ............. C08G 18/36 528/10 |
| 2015/0048046 A1 | 2/2015 | Dei et al. | |
| 2015/0064613 A1 | 3/2015 | Yokoyama et al. | |
| 2015/0159045 A1 | 6/2015 | Kanno et al. | |
| 2021/0071033 A1 | 3/2021 | Ganachaud et al. | |

FOREIGN PATENT DOCUMENTS

| | | |
|---|---|---|
| FR | 3078335 A1 | 8/2019 |
| JP | 2004-277502 A | 10/2004 |
| JP | 2008-285667 A | 11/2008 |
| JP | 2009-256437 A | 11/2009 |
| JP | 2010-020109 A | 1/2010 |
| JP | 2010-093111 A | 4/2010 |
| JP | 2011-118373 A | 6/2011 |
| JP | 2011-215385 A | 10/2011 |
| JP | 2013-083963 A | 5/2013 |
| JP | 2015-189856 A | 11/2015 |
| JP | 2015-232053 A | 12/2015 |
| JP | 2017-181595 A | 10/2017 |
| JP | 2021-517918 A | 7/2021 |
| KR | 10-2015-0021542 A | 3/2015 |
| WO | 2011/052611 A1 | 5/2011 |
| WO | 2013/191203 A1 | 12/2013 |
| WO | 2014/050834 A1 | 4/2014 |
| WO | 2016/031563 A1 | 3/2016 |
| WO | 2016/111210 A1 | 7/2016 |
| WO | 2017/122465 A1 | 7/2017 |
| WO | 2018/066515 A1 | 4/2018 |
| WO | 2019/166507 A1 | 9/2019 |

OTHER PUBLICATIONS

International Preliminary Report on Patentability received for PCT Patent Application No. PCT/EP2019/078033, mailed on Apr. 29, 2021, 7 pages.
International Search Report and Written Opinion received for PCT Patent Application No. PCT/EP2019/078033, mailed on Dec. 12, 2019, 9 pages.

\* cited by examiner

*Primary Examiner* — Jeffrey D Washville
(74) *Attorney, Agent, or Firm* — Faegre Drinker Biddle & Reath LLP

(57) ABSTRACT

To provide a polysiloxane composition capable of suppressing the generation of voids when forming a siliceous film. A polysiloxane composition comprising a polysiloxane; a dicarboxylic acid having the first acid dissociation constant $pKa_1$ of 4.0 or less and represented by the following formula (II): HOOC-L-COOH (II) (wherein, L is a single bond, a hydroxy-substituted or amino-substituted alkylene having 1 to 6 carbon atoms, a substituted or unsubstituted alkenylene having 2 to 4 carbon atoms, a substituted or unsubstituted alkynylene having 2 to 4 carbon atoms, or a substituted or unsubstituted arylene having 6 to 10 carbon atoms); and a solvent.

9 Claims, No Drawings

POLYSILOXANE COMPOSITION

CROSS-REFERENCE TO RELATED APPLICATIONS

This application is a national stage application (under 35 U.S.C. § 371) of PCT/EP2019/078033, filed Oct. 16, 2019, which claims benefit of European Application No. 2018-197702, filed Oct. 19, 2018, both of which are incorporated herein by reference in their entirety.

BACKGROUND OF THE INVENTION

Technical Field

The present invention relates to a polysiloxane composition. The present invention also relates to a method for producing a film using the same, a film using the same, and a method for producing an electronic device comprising the film.

Background Art

In the manufacture of electronic devices, especially semiconductor devices, an interlayer insulating film is sometimes formed between a transistor element and a bit line, between a bit line and a capacitor, between a capacitor and a metal wiring, between plural metal wirings, and the like. Further, an insulating material is sometimes filled in an isolation trench provided on a substrate surface or the like. Furthermore, after forming a semiconductor device on a substrate surface, a coating layer is formed using a sealing material to form a package. Such an interlayer insulating film or coating layer is often formed of a siliceous material.

On the other hand, in the field of electronic devices, the device rule has been gradually miniaturized, and the size of an insulating structure etc. that separates each element to be incorporated in the device is also required to be miniaturized. However, with the progress of miniaturization of the insulating structure, occurrence of defects in a siliceous film constituting a trench etc. has been increasing, and problem of decline in the efficiency of manufacturing the electronic device is becoming bigger.

On the other hand, as a method for forming a siliceous film, a chemical vapor deposition method (CVD method), a sol-gel method, a method for coating and baking a composition comprising a silicon-containing polymer, and the like are used. Among them, a method for forming a siliceous film using a composition is often adopted, since it is relatively simple. In order to form such a siliceous film, a composition comprising a silicon-containing polymer such as polysilazane, polysiloxane, polysiloxazane, or polysilane is coated on a substrate surface or the like and then baked, whereby silicon that is contained in the polymer is oxidized to form a siliceous film.

As materials having high heat resistance and high transparency, polysiloxane, in particular silsesquioxane, is known. Silsesquioxane is a polymer consisting of trifunctional siloxane structural units $RSi(O_{1.5})$ and is an intermediate presence between inorganic silica $(SiO_2)$ and organic silicone $(R_2SiO)$ in view of chemical structure. However, it is a specific compound so that cured product thereof exhibits high heat resistance that is characteristic in inorganic silica, although it is soluble in organic solvents.

PRIOR ART DOCUMENTS

Patent Documents

[Patent document 1] JP-A-2010-93111
[Patent document 2] JP-A-2004-277502
[Patent document 3] U.S. Pat. No. 8,642,437

SUMMARY OF THE INVENTION

Problems to be Solved by the Invention

In particular, it has been found that when a siliceous film is produced using polysiloxane of a structure having few organic groups in the siloxane structural unit, voids tend to be generated in the film. The present invention has been made based on the above-mentioned circumstances, and it is an object of the present invention to provide a polysiloxane composition capable of suppressing the generation of voids when forming a siliceous film. Another object of the present invention is to provide a method for producing a siliceous film or an electronic device using the same.

Means for Solving the Problems

The polysiloxane composition according to the present invention comprises
    a polysiloxane;
    a dicarboxylic acid having the first acid dissociation constant $pKa_1$ of 4.0 or less and represented by the following formula (II):

$$\text{HOOC-L-COOH} \qquad\qquad \text{(II)}$$

wherein, L is a single bond, a hydroxy-substituted or amino-substituted alkylene having 1 to 6 carbon atoms, a substituted or unsubstituted alkenylene having 2 to 4 carbon atoms, a substituted or unsubstituted alkynylene having 2 to 4 carbon atoms, or a substituted or unsubstituted arylene having 6 to 10 carbon atoms; and a solvent.

Further, the method for producing a siliceous film according to the present invention comprises applying the above composition on a substrate to form a coating film and heating the coating film.

Further, the electronic device according to the present invention comprises the above siliceous film.

Effects of the Invention

The polysiloxane composition according to the present invention is excellent in filling properties even when applied to a substrate having high aspect ratio. And, generation of voids can be suppressed at the time of manufacturing a siliceous film. Since the obtained siliceous film is excellent in planarity and electrical insulation properties, it can be used for interlayer insulating film of semiconductor device, passivation film, substrate planarization film, antireflection film, optical filter, high luminance light emitting diode, touch panel, solar cell and optical device such as optical waveguide.

DETAILED DESCRIPTION OF THE INVENTION

Mode for Carrying Out the Invention

<Polysiloxane Composition>

The polysiloxane composition according to the present invention (hereinafter sometimes referred to as the composition) comprises a polysiloxane, a dicarboxylic acid having a specific structure, and a solvent. Hereinafter, each component contained in the composition according to the present invention is described in detail.

(I) Polysiloxane

The structure of polysiloxane used in the present invention is not particularly limited and can be selected from any according to the purpose. Depending on the number of oxygen atoms bonded to a silicon atom, the skeleton structure of polysiloxane can be classified as follows: a silicone skeleton (the number of oxygen atoms bonded to a silicon atom is 2), a silsesquioxane skeleton (the number of oxygen atoms bonded to a silicon atom is 3), and a silica skeleton (the number of oxygen atoms bonded to a silicon atom is 4). In the present invention, any of these can be used. The polysiloxane molecules can contain multiple combinations of these backbone structures.

Preferably, the polysiloxane used in the present invention comprises:

a repeating unit represented by the following formula (Ia):

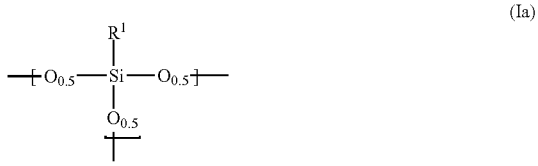

(Ia)

wherein,
$R^1$ is hydrogen, a monovalent to trivalent, linear, branched or cyclic, saturated or unsaturated, aliphatic hydrocarbon group having 1 to 30 carbon atoms, or a monovalent to trivalent, aromatic hydrocarbon having 6 to 30 carbon atoms,
in the aliphatic hydrocarbon group and the aromatic hydrocarbon group, one or more methylene are not replaced or replaced with oxy, imide or carbonyl, one or more hydrogens are not replaced or replaced with fluorine, hydroxy or alkoxy, and one or more carbon are not replaced or replaced with silicon, and
when $R^1$ is divalent or trivalent, $R^1$ connects Si atoms each other included in a plurality of repeating units),
and/or
a repeating unit represented by the following formula (Ib):

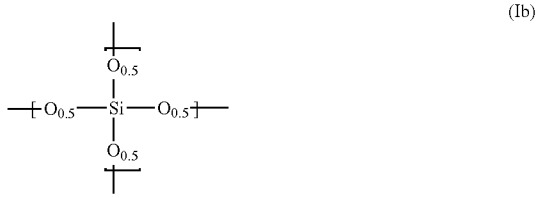

(Ib)

In the formula (Ia), when $R^1$ is a monovalent group, $R^1$ includes, for example, (i) alkyl, such as methyl, ethyl, propyl, butyl, pentyl, hexyl, heptyl, octyl and decyl, (ii) aryl, such as phenyl, tolyl and benzyl, (iii) fluoroalkyl, such as trifluoromethyl, 2,2,2-trifluoroethyl and 3,3,3-trifluoropropyl, (iv) fluoroaryl, (v) cycloalkyl, such as cyclohexyl, (vi) nitrogen-containing groups having amino or imide structure, such as isocyanate and amino, and (Vii) oxygen-containing groups having an epoxy structure, such as glycidyl, or an acryloyl structure or a methacryloyl structure. It is preferably methyl, ethyl, propyl, butyl, pentyl, hexyl, phenyl, tolyl, glycidyl and isocyanate. As fluoroalkyl, perfluoroalkyl is preferred, and trifluoromethyl and pentafluoroethyl are particularly preferred. The compound wherein $R^1$ is methyl is preferred, since raw material thereof is easily obtained, it has high film hardness after curing and it has high chemical resistance. Further, phenyl is preferred, since it increases solubility of the polysiloxane in the solvent and hardly cracks the cured film. It is preferred that $R^1$ has hydroxy, glycidyl, isocyanate or amino, since the adhesion to the substrate is improved.

Further, when $R^1$ is a divalent or trivalent group, $R^1$ preferably includes, for example, (i) groups obtained by removing two or three hydrogens from alkanes such as methane, ethane, propane, butane, pentane, hexane, heptane, octane and decane, (ii) groups obtained by removing two or three hydrogens from cycloalkanes such as cycloheptane, cyclohexane and cyclooctane, (iii) groups obtained by removing two or three hydrogens from aromatic compounds constituted only by a hydrocarbon such as benzene and naphthalene, and (iv) groups obtained by removing two or three hydrogens from nitrogen- and/or oxygen-containing cycloaliphatic hydrocarbon compound which contains an amino group, an imino group and/or a carbonyl group, such as piperidine, pyrrolidine and isocyanurate. More preferably, $R^1$ is the above (iv) to improve pattern sagging and increase adhesion to the substrate.

Preferably, $R^1$ is hydrogen, or a linear, branched or cyclic, aliphatic hydrocarbon group having 1 to 10 carbon atoms, or an aromatic hydrocarbon group having 6 to 10 carbon atoms.

More preferably, $R^1$ is selected from the group consisting of a hydrogen atom, methyl, ethyl and phenyl, and further preferably, $R^1$ is methyl.

The polysiloxane used in the present invention can further comprise a repeating unit represented by the following formula (Ic):

(Ic)

wherein,
$R^2$ is each independently hydrogen, a monovalent to trivalent, linear, branched or cyclic, saturated or unsaturated, aliphatic hydrocarbon group having 1 to 30 carbon atoms, or a monovalent to trivalent, aromatic hydrocarbon group having 6 to 30 carbon atoms, in the aliphatic hydrocarbon group and the aromatic hydrocarbon group, one or more methylene are not replaced or replaced with oxy, imide or carbonyl, and one or more hydrogens are not replaced or replaced with fluorine, hydroxy or alkoxy, and one or more carbons are not replaced or replaced with silicon, and when R² is divalent or trivalent, R² connects Si atoms each other included in a plurality of repeating units.

Preferably, R² is hydrogen, or a linear, branched or cyclic, aliphatic hydrocarbon group having 1 to 10 carbon atoms, or an aromatic hydrocarbon group having 6 to 10 carbon atoms.

More preferably, R² is each independently selected from the group consisting of a hydrogen atom, methyl, ethyl and phenyl. Further preferably, R² is methyl.

It is preferred that the polysiloxane used in the present invention has silanol at its end. The content of silanol is set as S2/S1, which is a ratio of the area intensity S2 of the infrared spectrum absorption band in the range of 900±100 cm$^{-1}$ assigned to SiOH to the area intensity S1 of the infrared spectrum absorption band in the range of 1100±100 cm$^{-1}$ assigned to Si—O. In the present invention, S2/S1 is preferably 0.05 to 0.25.

Since the polysiloxane used in the present invention is required to have high hardness and heat resistance, the ratio of the number of the repeating unit represented by Formula (Ib) to the total number of the repeating units represented by Formula (Ia) and Formula (Ib) contained in the molecule is preferably 1 to 100%, and more preferably 20 to 100%. Further, the ratio of the repeating units other than the repeating units (Ia) and (Ib) to the total repeating units in the molecule is preferably 90% or less, and more preferably 80% or less.

The mass average molecular weight of the polysiloxane used in the present invention is usually 500 to 5,000. From the viewpoint of solubility in organic solvents, coatability on substrates, and solubility in alkaline developers, it is preferably 500 to 4,000, and more preferably 1,000 to 3,000. Here, the mass average molecular weight means a mass average molecular weight in terms of polystyrene, which can be measured by the gel permeation chromatography based on polystyrene.

Such polysiloxane can be obtained, for example, by hydrolysis and condensation, optionally in the presence of an acidic catalyst or a basic catalyst, of a silane compound represented by the following formula (ia):

R¹'[Si(OR$^a$)₃]$_p$  (ia)

wherein, p is 1 to 3,

R¹' is hydrogen, a monovalent to trivalent, linear, branched or cyclic, saturated or unsaturated, aliphatic hydrocarbon group having 1 to 30 carbon atoms, or a monovalent to trivalent, aromatic hydrocarbon group having 6 to 30 carbon atoms, in the aliphatic hydrocarbon group and the aromatic hydrocarbon group, one or more methylene are not replaced or replaced with oxy, imide or carbonyl, one or more hydrogens are not replaced or replaced with fluorine, hydroxy or alkoxy, and one or more carbons are not replaced or replaced with silicon, and R$^a$ represents alkyl having 1 to 10 carbon atoms, and/or a silicon compound represented by the following formula (ib):

Si(OR$^b$)₄  (ib)

wherein,

R$^b$ is alkyl having 1 to 10 carbon atoms, and preferably methyl, ethyl, n-propyl, isopropyl and n-butyl.

In the formula (ia), preferable R$^a$ is the same as the preferable R¹ described above.

In the formula (ia), R$^a$ includes, for example, methyl, ethyl, n-propyl, isopropyl and n-butyl and the like. In the formula (ia), R$^a$ are plurally included, and each R$^a$ can be identical or different.

Specific examples of the silicon compound represented by the formula (ia) include, for example, methyl trimethoxysilane, methyl triethoxysilane, methyl triisopropoxysilane, methyl tri-n-butoxysilane, ethyl trimethoxysilane, ethyl triethoxysilane, ethyl triisopropoxysilane, ethyl tri-n-butoxysilane, n-propyl trimethoxysilane, n-propyl triethoxysilane, n-butyl trimethoxysilane, n-butyl triethoxysilane, n-hexyl trimethoxysilane, n-hexyl triethoxysilane, decyl trimethoxysilane, phenyl trimethoxysilane, phenyl triethoxysilane, trifluoromethyl trimethoxysilane, trifluoromethyl triethoxysilane, 3,3,3-trifluoropropyl trimethoxysilane, tris-(3-trimethoxysilylpropyl)isocyanurate, tris-(3-triethoxysilylpropyl)isocyanurate, tris-(3-trimethoxysilylethyl)isocyanurate, and the like. Among them, methyl trimethoxysilane, methyl triethoxysilane, methyl tripropoxysilane and phenyl trimethoxysilane are preferable.

Specific examples of the silicon compound represented by the formula (ib) include, for example, tetramethoxysilane, tetraethoxysilane, tetra-n-propoxysilane, tetra-iso-propoxysilane, tetra-n-butoxysilane, tetra-sec-butoxysilane, tetra-tert-butoxysilane, tetrakis(2-ethylbutoxy)silane and the like. Among them, tetramethoxysilane, tetraethoxysilane and tetra-iso-propoxysilane are preferable.

The silicon compounds can also be used in combination of two or more of any of these.

(II) Dicarboxylic Acid

The dicarboxylic acid used in the present invention has the first acid dissociation constant pKa₁ of 4.0 or less and is represented by the following formula (II):

HOOC-L-COOH  (II)

wherein,

L is a single bond, a hydroxy-substituted or amino-substituted alkylene having 1 to 6 carbon atoms, a substituted or unsubstituted alkenylene having 2 to 4 carbon atoms, a substituted or unsubstituted alkynylene having 2 to 4 carbon atoms, or a substituted or unsubstituted arylene having 6 to 10 carbon atoms.

In the present invention, alkenylene means a divalent group having one or more double bonds. Similarly, alkynylene means a divalent group having one or more triple bonds.

Preferably, L is a single bond, a hydroxy-substituted alkylene having 2 to 4 carbon atoms, an unsubstituted alkenylene having one C=C bond and 2 to 4 carbon atoms, or an unsubstituted arylene having 6 to 10 carbon atoms.

More preferably, L is a single bond, vinylene or hydroxyethylene.

The first acid dissociation constant is a value described in CRC Handbook of Chemistry and Physics 97th Edition pp 5-88, and the values of typical dicarboxylic acids are as follows:

maleic acid: 1.92,
fumaric acid: 3.02,
oxalic acid: 1.25,
o-phthalic acid: 2.94,
malic acid: 3.40,
succinic acid: 4.21,
malonic acid: 2.85,
aspartic acid: 1.99,
glutamic acid: 2.13, and
3-aminohexanedioic acid: 2.14

Specific examples of the dicarboxylic acid used in the present invention include oxalic acid, maleic acid, fumaric acid, malic acid, o-phthalic acid, aspartic acid, glutamic acid and 3-aminohexanedioic acid, preferably oxalic acid, maleic acid, fumaric acid, malic acid or o-phthalic acid, and more preferably maleic acid and oxalic acid. The dicarboxylic acid can be used alone or in combination of two or more of any of these.

In the composition according to the present invention, the ratio of mol number of the dicarboxylic acid used in the present invention to the mol number of the polysiloxane used in the present invention is 0.1 to 6.0, more preferably 0.15 to 2.0, and further preferably 0.2 to 1.0.

(III) Solvent

The solvent is not particularly limited as long as it uniformly dissolves or disperses polysiloxane and the dicarboxylic acid as well as the additives that are optionally added. Examples of the solvent that can be used in the present invention include ethylene glycol monoalkyl ethers, such as ethylene glycol monomethyl ether, ethylene glycol monoethyl ether, ethylene glycol monopropyl ether and ethylene glycol monobutyl ether; diethylene glycol dialkyl ethers, such as diethylene glycol dimethyl ether, diethylene glycol diethyl ether, diethylene glycol dipropyl ether and diethylene glycol dibutyl ether; ethylene glycol alkyl ether acetates, such as methyl cellosolve acetate and ethyl cellosolve acetate; propylene glycol monoalkyl ethers, such as propylene glycol monomethyl ether and propylene glycol monoethyl ether; propylene glycol alkyl ether acetates such as propylene glycol monomethyl ether acetate (PGMEA), propylene glycol monoethyl ether acetate and propylene glycol monopropyl ether acetate; aromatic hydrocarbons, such as benzene, toluene and xylene; ketones, such as methyl ethyl ketone, acetone, methyl amyl ketone, methyl isobutyl ketone and cyclohexanone; alcohols, such as ethanol, propanol, butanol, hexanol, cyclohexanol, ethylene glycol and glycerin; esters, such as ethyl lactate, ethyl 3-ethoxypropionate, methyl 3-methoxypropionate; and cyclic esters, such as γ-butyrolactone. Such a solvent can be used alone or in combination of two or more of any of these, and the amount used thereof varies depending on coating method or requirement of the film thickness after the coating.

So as to improve the workability by the coating method to be adopted and in consideration of the permeability of the solution into the fine groove and the film thickness required in the groove outside, the content of the solvent in the composition according to the present invention can be selected suitably according to the mass average molecular weight of polysiloxane to be used, its distribution and its structure. The composition according to the present invention comprises a solvent at a ratio of generally 50 to 99.9 mass %, and preferably 60 to 99 mass %, based on the total mass of the composition.

The composition according to the present invention essentially comprises the above (I) to (III), but further compounds can be optionally combined. These materials which can be combined are described below. The content of the components other than (I) to (III) contained in the total composition is preferably 10% or less, and more preferably 5% or less, based on the total mass.

The composition according to the present invention can optionally contain other additives. The additives include surfactants, adhesion enhancing agents, antifoaming agents, curing accelerators for thermosetting, and the like.

The surfactant is added for the purpose of improving coating properties, developability, and the like. The surfactants which can be used in the present invention include nonionic surfactants, anionic surfactants, amphoteric surfactants, and the like.

Examples of the nonionic surfactant include, polyoxyethylene alkyl ethers, such as polyoxyethylene lauryl ether, polyoxyethylene oleyl ether and polyoxyethylene cetyl ether; polyoxyethylene fatty acid diester; polyoxyethylene fatty acid monoester; polyoxyethylene polyoxypropylene block polymer; acetylene alcohol; acetylene alcohol derivatives, such as polyethoxylate of acetylene alcohol; acetylene glycols; acetylene glycol derivatives, such as polyethoxylate of acetylene glycol; fluorine-containing surfactants, for example, FLUORAD (trade name, manufactured by 3M Japan Limited), MEGAFAC (trade name: manufactured by DIC Cooperation), SURFLON (trade name, manufactured by AGC Inc.); or organosiloxane surfactants, for example, KP341 (trade name, manufactured by Shin-Etsu Chemical Co., Ltd.), and the like. Examples of the acetylene glycol include 3-methyl-1-butyne-3-ol, 3-methyl-1-pentyn-3-ol, 3,6-dimethyl-4-octyne-3,6-diol, 2,4,7,9-tetramethyl-5-decyne-4,7-diol, 3,5-dimethyl-1-hexyne-3-ol, 2,5-dimethyl-3-hexyne-2,5-diol, 2,5-dimethyl-2,5-hexane-diol, and the like.

Further, examples of the anionic surfactant include ammonium salt or organic amine salt of alkyl diphenyl ether disulfonic acid, ammonium salt or organic amine salt of alkyl diphenyl ether sulfonic acid, ammonium salt or organic amine salt of alkyl benzene sulfonic acid, ammonium salt or organic amine salt of polyoxyethylene alkyl ether sulfuric acid, ammonium salt or organic amine salt of alkyl sulfuric acid, and the like.

Further, examples of the amphoteric surfactant include 2-alkyl-N-carboxymethyl-N-hydroxyethyl imidazolium betaine, lauric acid amide propyl hydroxysulfone betaine, and the like.

These surfactants can be used alone or in combination of two or more of any of these, and the blending ratio thereof is usually 50 to 10,000 ppm, preferably 100 to 8,000 ppm, based on the composition according to the present invention.

The adhesion enhancing agent has an effect of preventing peeling of a pattern due to a stress applied after baking when a cured film is formed using the composition according to the present invention. As the adhesion enhancing agent, imidazoles, silane coupling agents, and the like are preferable. In the case of imidazoles, 2-hydroxybenzimidazole, 2-hydroxyethylbenzimidazole, benzimidazole, 2-hydroxyimidazole, imidazole, 2-mercaptoimidazole and 2-aminoimidazole are preferred, and 2-hydroxybenzimidazole, benzimidazole, 2-hydroxyimidazole and imidazole are particularly preferably used.

The antifoaming agents include, alcohols ($C_{1-18}$), higher fatty acids, such as oleic acid and stearic acid, higher fatty acid esters, such as glycerin monolaurate, polyethers, such as polyethylene glycol (PEG) (Mn: 200 to 10,000) and polypropylene glycol (PPG) (Mn: 200 to 10,000), silicone compounds, such as dimethyl silicone oil, alkyl-modified silicone oil and fluorosilicone oil, and the above-mentioned organosiloxane surfactants. These can be used alone or in combination of two or more of any of these, and blending ratio thereof is preferably 0.1 to 3 parts by mass based on 100 parts by mass of the total mass of polysiloxane.

The curing accelerators for thermosetting include thermal base generators, thermal acid generators, and the like. The composition according to the present invention can increase the curing rate during heating of the coating film by including a curing accelerator for thermosetting.

In the present invention, the thermal acid generator or the thermal base generator refers to a compound which causes bond cleavage by heat to generate an acid or a base. Preferably, these do not generate an acid or a base, or generate only a small amount by the heat at the time of prebaking after application of the composition.

The thermal acid generator include salts and esters which generate an organic acid, for example, various aliphatic sulfonic acids and their salts; various aliphatic carboxylic acids, such as citric acid, acetic acid and maleic acid, and their salts; various aromatic carboxylic acids, such as benzoic acid and phthalic acid, and their salts; aromatic sulfonic acids and their ammonium salts; various amine salts; aromatic diazonium salts; and phosphonic acids and their salts. Among the thermal acid generators, in particular, a salt composed of an organic acid and an organic base is preferable, and a salt composed of a sulfonic acid and an organic base is further preferable. Preferred sulfonic acids include p-toluenesulfonic acid, benzenesulfonic acid, p-dodecylbenzenesulfonic acid, 1,4-naphthalenedisulfonic acid, methanesulfonic acid, and the like. These acid generators can be used alone or in combination of any of these.

Examples of the thermal base generator include compounds that generate a base, such as imidazoles, tertiary amines and quaternary ammoniums, and mixtures thereof. Examples of bases to be released are imidazole derivatives, such as N-(2-nitrobenzyloxycarbonyl)imidazole, N-(3-nitrobenzyloxycarbonyl)imidazole, N-(4-nitrobenzyloxycarbonyl)imidazole, N-(5-methyl-2-nitrobenzyloxycarbonyl)imidazole, N-(4-chloro-2-nitrobenzyloxycarbonyl)imidazole; and 1,8-diazabicyclo[5.4.0]undecene-7. These base generators can be used alone or in combination of any of these as in the case of the acid generator.

The blending ratio of the curing accelerator for thermosetting is preferably 0.01 to 1 part by mass based on 100 parts by mass of the total mass of polysiloxane.

The composition according to the present invention can also be used as a photosensitive composition by further comprising a photobase generator, a photoacid generator, and the like.

<Method for Producing Siliceous Film>

The method for producing a siliceous film according to the present invention comprises coating the composition according to the present invention on a substrate to form a coating film and heating the coating film. The method for forming a siliceous film is described below in the order of steps.

(1) Coating Step

The shape of the substrate is not particularly limited, and it can be freely selected according to the purpose. However, the composition according to the present invention is characterized by being easily penetrated even into narrow trenches and the like and capable of forming a uniform siliceous film even in the inside of a trench, so that it can be applied to a substrate having trench portions and holes of a high aspect ratio. Specifically, it can be applied to a substrate having at least one trench having a width of the deepest portion of 0.2 μm or less and an aspect ratio of 2 or more. Shape of the trench is not particularly limited, and the cross section thereof can be any of a rectangle, a forward tapered shape, a reverse tapered shape, a curved surface shape, and the like. Both end portions of the trench can be opened or closed.

Typical examples of the substrate having at least one trench of a high aspect ratio include a substrate for an electronic device comprising a transistor element, a bit line, a capacitor, and the like. For the fabrication of such an electronic device, subsequent to a step of forming an insulating film between a transistor element called PMD and a bit line, between a transistor element and a capacitor, between a bit line and a capacitor or between a capacitor and a metal wiring, or an insulating film between a plurality of metal wirings called IMD, or a step of filling an isolation trench, a through hole plating step of forming a hole vertically penetrating the filling material of the fine trench is included in some cases.

Coating can be performed by any method. Specifically, it can be freely selected from dip coating, roll coating, bar coating, brush coating, spray coating, doctor coating, flow coating, spin coating, slit coating, and the like. Moreover, as a substrate on which the composition is coated, suitable substrates, such as a silicon substrate, a glass substrate, a resin film, can be used. Various semiconductor devices and the like can be formed on these substrates, if necessary. If the substrate is a film, gravure coating is also available. A drying step can also be provided separately after coating a film if desired. Further, by repeating the coating step once or twice or more as needed, the film thickness of the coating film formed can be made as desired.

(2) Pre-Baking Step

After forming the coating film of the composition, it is preferable to carry out pre-baking (pre-heating treatment) of the coating film in order to dry the coating film and reduce the residual amount of the solvent. The pre-baking process can be generally carried out at a temperature of 70 to 250° C., preferably 100 to 200° C., in the case of a hot plate, for 10 to 300 seconds, preferably 30 to 180 seconds and in the case of a clean oven, for 1 to 30 minutes.

(3) Curing Step

A siliceous film is formed by heating the coating film. In the present invention, the siliceous film means one in which the ratio of the number of oxygen atoms to the number of silicon atoms in polymer is 1.2 or more.

As the heating apparatus to be used in the curing step, the same one used in the above-mentioned pre-baking step can be used. The heating temperature in this heating process is not particularly limited as long as it is a temperature at which the siliceous film can be formed, and it can be freely determined. However, if a silanol group remains, chemical resistance of the siliceous film can become insufficient or the dielectric constant of the siliceous film can become high. From this viewpoint, for the heating temperature, relatively high temperature is generally selected. Specifically, heating is performed at preferably 360° C. or lower, more preferably 300° C. or lower, and particularly preferably 250° C. or lower. On the other hand, in order to accelerate the curing reaction, the heating temperature is preferably 70° C. or higher, more preferably 100° C. or higher, and particularly preferably 110° C. or higher. Further, the heating time is not particularly limited, and is generally determined to be 10 minutes to 24 hours, preferably 30 minutes to 3 hours. This heating time is the time after the temperature of the film reaches a desired heating temperature. Normally, it takes several minutes to several hours until the film reaches a desired temperature from the temperature before heating. The curing step is preferably performed under a nitrogen atmosphere.

Void generation can occur in this curing step. In particular, void generation tends to increase when the organic group contained in polysiloxane decreases. However, in the case that the composition of the present invention is used, the void generation can be suppressed even when the number of organic groups contained in polysiloxane is less.

<Siliceous Film and Electronic Device Comprising the Same>

The siliceous film according to the present invention can be produced by coating the composition according to the present invention on a substrate and curing.

The siliceous film formed using the composition according to the present invention can achieve excellent transparency, chemical resistance, environmental resistance, electrical insulation, heat resistance and the like. Therefore, it can be suitably used in various fields as an interlayer insulating film for low temperature polysilicon, a buffer coat film for IC chip, a transparent protective film, and the like.

The present invention is described more specifically below with reference to Examples and Comparative Examples, but the present invention is not limited by these Examples and Comparative Examples.

Gel permeation chromatography (GPC) was measured using Alliance e2695 High Performance GPC system (trade name, manufactured by Nihon Waters K.K.) and Super Multipore HZ-N GPC column (trade name, manufactured by Tosoh Corporation). The measurement was performed using monodispersed polystyrene as a standard sample and tetrahydrofuran as a developing solvent, under the conditions of a flow rate of 0.6 ml/min and a column temperature of 40° C., and thereafter calculating the mass average molecular weight as a relative molecular weight to the standard sample.

Synthesis Example 1 (Synthesis of Polysiloxane A)

In a 2 L flask equipped with a stirrer, a thermometer and a condenser, 32.5 g of 40 mass % tetra-n-butylammonium hydroxide (TBAH) aqueous solution and 308 ml of 2-methoxypropanol (PGME) are charged. Then, a mixed solution of 19.6 g of methyltrimethoxysilane and 9.2 g of tetramethoxysilane is prepared in a dropping funnel. The mixed solution is dropped into the flask and stirred at room temperature for 2 hours, and then 500 ml of normal propyl acetate (n-PA) is added, and then 1.1 equivalents of a 3% maleic acid aqueous solution with respect to TBAH is added. The mixture is stirred for neutralization for 1 hour. To the neutralized solution, 500 ml of normal propyl acetate (n-PA) and 250 ml of water are added, the reaction solution is separated into two layers, the obtained organic layer is washed three times with 250 cc of water and concentrated under reduced pressure to remove water and the solvent, and PGME is added for adjustment so as to make the solid content of the concentrate 7 mass %.

When the molecular weight (in terms of polystyrene) of the resulting Polysiloxane A is measured by GPC, the mass average molecular weight (hereinafter sometimes abbreviated as "Mw") is 2,068.

Synthesis Example 2 (Synthesis of Polysiloxane B)

In a 2 L flask equipped with a stirrer, a thermometer and a condenser, 14.0 g of methyltrimethoxysilane, 15.4 g of tetramethoxysilane, and 308 ml of 2-methoxypropanol (PGME) are charged, and cooled to 0.2° C. Thereafter, 96.6 g of a 37 mass % tetra-n-butylammonium hydroxide (TBAH) methanol solution is dropped into the flask from a dropping funnel and stirred for 2 hours, and then 500 ml of normal propyl acetate (n-PA) is added. The reaction solution is cooled again to 0.2° C., and after adding 1.1 equivalents of 3% hydrochloric acid aqueous solution with respect to TBAH, the mixture is stirred for neutralization for 1 hour. To the neutralized solution, 1,000 ml of normal propyl acetate (n-PA) and 250 ml of water are added, the reaction solution is separated into two layers, the obtained organic layer is washed three times with 250 cc of water and then concentrated under reduced pressure to remove water and the solvent, and PGME is added for adjustment so as to make the solid content of the concentrate 7 mass %.

The resulting Polysiloxane B has Mw of 1,157.

Synthesis Example 3 (Synthesis of Polysiloxane C)

In a 2 L flask equipped with a stirrer, thermometer, and condenser, 49.9 g of a 40 mass % tetra-n-butylammonium hydroxide (TBAH) aqueous solution, 3.7 g of water and 37 ml of 2-methoxypropanol (PGME) are charged. Then, a mixed solution of 13.4 g of methyltriethoxysilane, 15.6 g of tetraethoxysilane, and 47 ml of 2-methoxypropanol (PGME) is prepared in a dropping funnel. The mixed solution is dropped into the flask and stirred at 40° C. for 2 hours, then cooled to room temperature and then 110 ml of methyl tert-butyl ether (MTBE) is added, and then 1.1 equivalents of 3% hydrochloric acid aqueous solution with respect to TBAH is added, and the mixture is stirred for neutralization for 15 minutes. To the neutralized solution, 1,000 ml of methyl-tert-butyl ether (MTBE) and 250 ml of water are added, the reaction solution is separated into two layers, the obtained organic layer is washed three times with 250 cc of water and then concentrated under reduced pressure to remove water and the solvent, and PGME is added for adjustment so as to make the solid content of the concentrate 7 mass %.

The resulting Polysiloxane C has Mw of 2,495.

Synthesis Example 4 (Synthesis of Polysiloxane D)

In a 2 L flask equipped with a stirrer, a thermometer and a condenser, 84.3 g of tetraethoxysilane and 566 ml of isopropanol (IPA) are charged. Then, 8.0 g of hydrochloric acid and 30 g of water are prepared in a dropping funnel. The mixed solution is dropped into a flask and stirred at 25° C. for 3 hours, 200 ml of 2-methoxypropanol (PGME) is added, and then concentrated under reduced pressure to remove the acid catalyst, water and the solvent, and PGME is added for adjustment so as to make the solid content of the concentrate 45 mass %.

The resulting Polysiloxane D has Mw of 1,066.

Synthesis Example 5 (Synthesis of Polysiloxane E)

In a 2 L flask equipped with a stirrer, thermometer, and condenser, 29.1 g of methyltrimethoxysilane, 0.6 g of phenyltrimethoxysilane, 0.4 g of tetramethoxysilane, and 308 ml of 2-methoxypropanol (PGME) are charged and cooled to 0.2° C. Then, 96.6 g of a 37 mass % tetra-n-butylammonium hydroxide (TBAH) methanol solution is dropped into the flask from a dropping funnel and stirred for 2 hours, and then 500 ml of normal propyl acetate (n-PA) is added. The reaction solution is then cooled again to 0.2° C., and after adding 1.1 equivalents of 3% hydrochloric acid aqueous solution with respect to TBAH, the mixture is stirred for neutralization for 1 hour. To the neutralized solution, 1,000 ml of normal propyl acetate (n-PA) and 250 ml of water are added, the reaction solution is separated into two layers, the obtained organic layer is washed three times with 250 cc of water and then concentrated under reduced pressure to remove water and the solvent, and PGME is added for adjustment so as to make the solid content of the concentrate 7 mass %.

The resulting Polysiloxane E has Mw of 1,286.

Examples 1 to 18 and Comparative Examples 1 to 4 (Preparation of Polysiloxane Compositions)

The polysiloxane compositions of Examples 1 to 18 and Comparative Examples 1 to 4 are prepared, which comprise polysiloxane and maleic acid described in Table 1 below in the proportions shown in Table 1, with the balance being PGMEA. In the table, % means mass % (the same applies also to Table 2).

TABLE 1

| | | Polysiloxane | | | | | Dicarboxylic acid | Ratio of mol number of the dicarboxylic acid to the mol | Evaluation of |
|---|---|---|---|---|---|---|---|---|---|
| | | A | B | C | D | E | Maleic acid | number of the polysiloxane | voids |
| Example | 1 | 6.00% | — | — | — | — | 0.07% | 0.205 | A |
| | 2 | 6.00% | — | — | — | — | 0.13% | 0.383 | A |
| | 3 | 6.00% | — | — | — | — | 0.31% | 0.917 | A |
| | 4 | 6.00% | — | — | — | — | 0.61% | 1.808 | A |
| | 5 | 8.00% | — | — | — | — | 0.09% | 0.207 | A |
| | 6 | 8.00% | — | — | — | — | 0.17% | 0.385 | A |
| | 7 | 8.00% | — | — | — | — | 0.41% | 0.92 | A |
| | 8 | — | 6.00% | — | — | — | 0.16% | 0.267 | A |
| | 9 | — | 6.00% | — | — | — | 3.41% | 5.667 | A |
| | 10 | — | 6.00% | — | — | — | 0.64% | 1.065 | A |
| | 11 | — | — | 6.89% | — | — | 0.58% | 1.797 | A |
| | 12 | — | — | 6.92% | — | — | 0.72% | 2.222 | A |
| | 13 | — | — | 6.99% | — | — | 1.41% | 4.326 | A |
| | 14 | — | — | — | 7.99% | — | 0.10% | 0.109 | A |
| | 15 | — | — | — | 8.06% | — | 0.41% | 0.467 | A |
| | 16 | — | — | — | 8.07% | — | 0.81% | 0.925 | A |
| | 17 | — | — | — | 7.82% | — | 1.62% | 1.903 | A |
| | 18 | — | — | — | — | 8.00% | 0.09% | 0.121 | A |
| Comparative Example | 1 | 6.00% | — | — | — | — | 0.01% | 0.027 | B |
| | 2 | 8.00% | — | — | — | — | 0.01% | 0.029 | B |
| | 3 | — | 6.00% | — | — | — | 0.04% | 0.068 | B |
| | 4 | — | — | 6.92% | — | — | 0.01% | 0.034 | B |

Calculation is conducted by determining the molecular weight of maleic acid to be 116.1.

These polysiloxane compositions are applied on a Si wafer having a trench (width: about 20 nm, height: 500 nm) by spin coating, and after application, it is prebaked at 200° C. for 2 minutes in a hot plate. Thereafter, curing is performed by heating at 200° C. for 2 hours in a clean oven under a nitrogen atmosphere. Thereafter, the cross-sectional shape is observed with a scanning electron microscope (SEM, S-4700, manufactured by Hitachi High-Technologies Corporation) to confirm the presence or absence of a void. Evaluation criteria are defined as shown below:

A: Trenches are filled, and no voids are confirmed.
B: Trenches are filled, and voids are confirmed.

Examples 19 to 23 and Comparative Examples 5 to 14 (Preparation of Polysiloxane Compositions Using Dicarboxylic Acid Other than Maleic Acid)

The polysiloxane compositions of Examples 19 to 23 and Comparative Examples 5 to 14 are prepared, which comprise polysiloxane and maleic acid described in Table 2 below in the proportions shown in Table 2, with the balance being PGMEA. In the same manner as described above, the presence or absence of voids is confirmed, and the obtained results are as shown in Table 2.

TABLE 2

| | | | Dicarboxylic acid | | | | | | | Ratio of mol number of the | |
|---|---|---|---|---|---|---|---|---|---|---|---|
| | | Polysiloxane | Maleic acid | Fumaric acid | Oxalic acid | Malic acid | o-phtalic acid | Succinic acid | Malonic acid | dicarboxylic acid to the mol number of the polysiloxane | Evaluation of voids |
| Example | 19 | A 8.00% | — | 0.05% | — | — | — | — | — | 0.118 | A |
| | 20 | B 8.00% | — | — | 0.17% | — | — | — | — | 0.274 | A |
| | 21 | C 8.00% | 0.01% | — | 0.40% | — | — | — | — | 1.64 | A |
| | 22 | D 8.00% | — | — | — | 5.84% | — | — | — | 5.81 | A |
| | 23 | E 8.00% | — | — | — | — | 0.41% | — | — | 0.398 | A |
| Comparative Example | 5 | A 8.00% | — | 0.01% | — | — | — | — | — | 0.029 | B |
| | 6 | A 8.00% | — | — | 0.02% | — | — | — | — | 0.05 | B |
| | 7 | A 8.00% | — | — | — | 0.04% | — | — | — | 0.08 | B |
| | 8 | A 8.00% | — | — | — | — | 0.02% | — | — | 0.03 | B |
| | 9 | A 8.00% | — | — | — | — | — | 0.05% | — | 0.116 | B |
| | 10 | A 8.00% | — | — | — | — | — | 0.42% | — | 0.911 | B |
| | 11 | A 8.00% | — | — | — | — | — | 2.58% | — | 5.61 | B |
| | 12 | A 8.00% | — | — | — | — | — | — | 0.05% | 0.128 | B |

TABLE 2-continued

| | Polysiloxane | Dicarboxylic acid | | | | | | | Ratio of mol number of the dicarboxylic acid to the mol number of the polysiloxane | Evaluation of voids |
| | | Maleic acid | Fumaric acid | Oxalic acid | Malic acid | o-phtalic acid | Succinic acid | Malonic acid | | |
|---|---|---|---|---|---|---|---|---|---|---|
| 13 | A 8.00% | — | — | — | — | — | — | 0.42% | 1.03 | B |
| 14 | A 8.00% | — | — | — | — | — | — | 2.36% | 5.81 | B |

Calculation is conducted by determining the molecular weights as shown below:
maleic acid: 116.1,
fumaric acid: 116.1,
oxalic acid: 90.0,
malic acid: 134.1,
o-phthalic acid: 166.1,
succinic acid: 118.1, and
malonic acid: 104.1.

The invention claimed is:

1. A polysiloxane composition comprising:
   a polysiloxane;
   a dicarboxylic acid having the first acid dissociation constant $pKa_1$ of 4.0 or less and represented by the following formula (II):

HOOC-L-COOH  (II)

wherein,
   L is a single bond, a hydroxy-substituted or amino-substituted alkylene having 1 to 6 carbon atoms, a substituted or unsubstituted alkenylene having 2 to 4 carbon atoms, a substituted or unsubstituted alkynylene having 2 to 4 carbon atoms, or a substituted or unsubstituted arylene having 6 to 10 carbon atoms; and
   a solvent at a ratio of 50 to 99.9 mass % based on the polysiloxane composition,
   wherein the ratio of mol number of the dicarboxylic acid to the mol number of the polysiloxane is 0.1 to 6.0;
   wherein the polysiloxane comprises a repeating unit represented by the following formula (Ib):

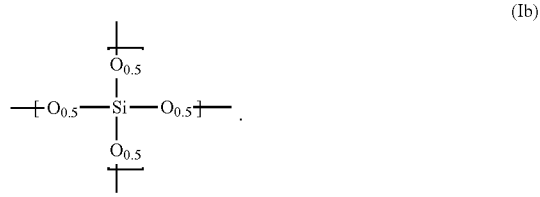

(Ib)

2. The composition according to claim 1, wherein L is a single bond, a hydroxy substituted alkylene having 2 to 4 carbon atoms, an unsubstituted alkenylene having one C=C bond and 2 to 4 carbon atoms, or an unsubstituted arylene having 6 to 10 carbon atoms.

3. The composition according to claim 1, wherein the dicarboxylic acid is selected from the group consisting of oxalic acid, maleic acid, fumaric acid, malic acid, and o-phthalic acid.

4. The composition according to claim 1, wherein the polysiloxane further comprises:
   a repeating unit represented by the following formula (Ia):

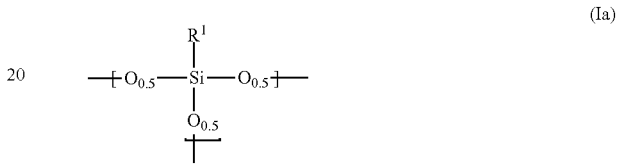

(Ia)

wherein,
   $R^1$ is hydrogen, a monovalent to trivalent, linear, branched or cyclic, saturated or unsaturated, aliphatic hydrocarbon group having 1 to 30 carbon atoms, or a monovalent to trivalent, aromatic hydrocarbon having 6 to 30 carbon atoms, in the aliphatic hydrocarbon group and the aromatic hydrocarbon group, one or more methylene are not replaced or replaced with oxy, imide or carbonyl, one or more hydrogens are not replaced or replaced with fluorine, hydroxy or alkoxy, and one or more carbons are not replaced or replaced with silicon, and
   when $R^1$ is divalent or trivalent, $R^1$ connects Si atoms each other included in a plurality of repeating units,
   wherein the ratio of the number of the repeating unit represented by Formula (Ib) to the total number of the repeating units represented by Formula (Ia) and Formula (Ib) contained in the polysiloxane is 1 to 100%.

5. The composition according to claim 4, wherein $R^1$ is selected from the group consisting of a hydrogen atom, methyl, ethyl and phenyl.

6. The composition according to claim 1, wherein the mass average molecular weight of the polysiloxane is 500 to 5,000.

7. The composition according to claim 1, wherein the ratio of mol number of the dicarboxylic acid to the mol number of the polysiloxane is 0.15 to 2.0.

8. A method for producing a siliceous film comprising applying the composition according to claim 1 on a substrate to form a coating film and heating the coating film.

9. An electronic device comprising the siliceous film according to claim 8.

* * * * *